United States Patent [19]
Dailey

[11] Patent Number: 5,642,350
[45] Date of Patent: Jun. 24, 1997

[54] PEER TO PEER NETWORK FOR A MOBILE RADIO TRANSCEIVER

[75] Inventor: Timothy E. Dailey, Forest, Va.

[73] Assignee: Ericsson Inc., Research Triangle Park, N.C.

[21] Appl. No.: 155,764

[22] Filed: Nov. 23, 1993

[51] Int. Cl.⁶ ...................................................... H04J 3/14
[52] U.S. Cl. ................................................................. 370/439
[58] Field of Search .................................. 370/94.1, 85.6, 370/85.1, 85.9, 85.11, 91, 92, 85.2, 85.3; 371/33, 62; 340/313, 314, 502, 504; 369/200

[56] References Cited

U.S. PATENT DOCUMENTS

| | | | |
|---|---|---|---|
| 4,063,220 | 12/1977 | Metcalfe et al. | 343/177 |
| 4,320,452 | 3/1982 | Kempf et al. | 364/200 |
| 4,550,402 | 10/1985 | Gable et al. | 370/85.11 |
| 4,584,679 | 4/1986 | Livingston et al. | 370/85.9 |
| 4,641,266 | 2/1987 | Walsh | 364/200 |
| 4,780,814 | 10/1988 | Hayek | 364/200 |
| 4,903,262 | 2/1990 | Dissosway et al. | 370/952 |
| 5,107,492 | 4/1992 | Roux et al. | 370/85.11 |
| 5,164,942 | 11/1992 | Kamerman et al. | 370/94.1 |
| 5,191,581 | 3/1993 | Woodbury et al. | 370/85.9 |
| 5,311,512 | 5/1994 | Bartis et al. | 370/85.2 |

OTHER PUBLICATIONS

"Motorola Semiconductors" 1983, pp. 1–6.

Primary Examiner—Douglas W. Olms
Assistant Examiner—Ajit Patel
Attorney, Agent, or Firm—Nixon & Vanderhye P.C.

[57] ABSTRACT

A peer-to-peer communication system includes multiple microcontrollers where each microcontroller has a microprocessor, memory, and an asynchronous receiver-transmitter connected by a parallel bus. A serial bus includes transmit, receive, and request lines. Each of the controllers is connected to the transmit and receive lines of the serial bus by way of its asynchronous receiver-transmitter. Each microcontroller is connected to the request line of the serial bus through an I/O port. A microcontroller detects an idle period on the serial bus and seizes control of the serial bus using that request line. The asynchronous receiver-transmitter is preferably a conventional universal asynchronous receiver-transmitter (UART). Thus, peer-to-peer communications are coordinated in a simplified fashion so that each device on the network can independently communicate with any other device on that network using standardized, industry accepted hardware and protocols.

26 Claims, 9 Drawing Sheets

TRANSMIT DATA CONTINUED

FIG. 11

PEER TO PEER NETWORK FOR A MOBILE RADIO TRANSCEIVER

BACKGROUND AND SUMMARY OF THE INVENTION

This invention relates to controllers that employ standard universal asynchronous receiver transmitters (UARTs) to asynchronously communicate over a peer to peer network with minimal hardware and at minimal cost. The present invention finds particularly advantageous application in the art of trunked radio repeater systems.

Trunked radio repeater systems include a primary site controller that receives and sends digital signals from/to various mobile transceivers via corresponding trunking cards. The primary site controller performs various control functions of the system such as call logging, dynamic regrouping, patch coordination, and routine (but nonetheless very important) control functions including assigning channels to new calls. One or more dispatch consoles, also connected to the primary site controller through its own trunking card, generate messages controlling the primary site controller and also monitor the status of the entire system via messages sent from the site controller.

In the past, mobile radio transceivers included a trunk-mounted mobile radio transceiver unit connected via a multiple conductor cable to a dashboard mounted control head in a vehicle. The control head was relatively simple, including only an on-off switch, a volume control, a microphone associated with a push to talk button (PTT), a speaker, receive/transmit indicator lamps, and a channel selector switch. The limited control functions provided by this type of simple control head were implemented using dedicated, independent control lines of the multi-conductor cable. For example, the on/off switch was connected to a dedicated control cable conductor; the volume control had its own conductor(s), the receive and transmit indicator lamps had respective dedicated conductors, etc.

Modern digital radio transceivers often interface with a wide variety of different types of external equipment commonly called "options" and include such things as mobile data terminals (MDTs), multiple data control heads, and the like. One way to connect these options to such a digital radio transceiver is to provide dedicated ports on the transceiver for each type of device. This is generally unsatisfactory because of the large number of different types of devices a user may want to connect to a particular radio transceiver. Another solution is to customize particular radio transceivers at the factory to interface with specific devices. But this increases manufacturing costs and limits users to only those options anticipated at the time of purchase.

One recent approach to this problem is disclosed in U.S. Pat. No. 4,903,262 to Dissosway et al entitled "Hardware Interface And Protocol For A Mobile Radio Transceiver" the disclosure of which is incorporated herein by reference. In that patent, control signals are communicated between a digital mobile transceiver, a digital control head, and a mobile data terminal over a common serial peripheral bus using a particular messaging protocol and architecture. While significantly improved over the earlier communication methods, the '262 patent protocol and architecture suffer some disadvantages. For example, the '262 network is configured as a master/slave system. As a result, once a communications request line is activated by a "slave" device, a single master device must poll all the other slave devices on the network to see which slave device made the request to send messages. Thus, for two slave devices that wish to communicate with each other, the master must poll the "sending" slave device for the message and repeat the message for the "receiving slave" device. This configuration is inefficient and requires considerable data processing overhead.

Perhaps more significantly, this approach is not fault tolerant. If the master fails, the entire network goes down. This could be particularly devastating in public service applications of trunked radio communication systems including police, fire and other public safety officials. In these emergency situations involving significant risks to life and property, it is highly desirable to have a fault tolerant as well as efficient communications network.

In contrast to a master/slave architecture, a "peer-to-peer network" permits every device on the network to initiate as well as receive messages from the other devices on the network. Because all devices have equal access to the network to send and receive messages, they are referred to as "peers." U.S. Pat. No. 4,992,926 entitled "Peer To Peer Register Exchange Controller For Industrial Programmable Controllers" discloses a communication network including a group of programmable logic controllers (PLCs) which can communicate in a peer to peer fashion. However, the '926 patent requires that a time slice be allocated to each device, with each time slot requiring a first block for sending data and a second block referred to as an interblock gap time. Devices can only send messages during their corresponding time slice. The complicated and restricted nature of the peer-to-peer type network of the '926 patent, e.g. the time slice communication protocol, requires significant data processing overhead to monitor and administer.

Another drawback of certain other peer to peer serial networks is that in order for a controller to asynchronously transmit and receive messages, specialized communication hardware must be provided in the controller. For example, U.S. Pat. No. 4,780,814 entitled "Global Serial Channel For Microcontroller" describes a proprietary communications interface referred to as the "GSC interface" that permits a microcontroller (i.e. the INTEL 8051 microcontroller) formed on the same IC chip as the controller to intelligently communicate with peripheral units over a serial bus in peer to peer fashion. The GSC interface supports carrier-sense multi-access with collision detection (CSMA/CD) which is a nonstandard, proprietary communication protocol that requires the proprietary GSC interface circuitry to implement.

Use of proprietary circuitry and protocols has a number of drawbacks. First, its specialized nature and its single source for purchase make it more expensive and less convenient to obtain relative to standard components mass produced by multiple vendors. Second, proprietary products are usually incompatible with products from other vendors that may be necessary for a particular application. Third, as the relevant technology develops and is refined, proprietary products often become obsolete as standardized, nonproprietary, industry-accepted technology becomes the norm.

The present invention resolves the various drawbacks of the various approaches described above by providing a simple way to coordinate peer to peer communications over a serial network so that each device on that network can independently communicate with any other device on that network. In addition, the present invention accomplishes this using standardized, industry-accepted hardware and protocols for existing microcontrollers including, for example, standard universal asynchronous receiver transmitters (UARTs) and standard RS-485 transceivers.

The peer-to-peer communication system in accordance with the present invention includes multiple controllers where each controller has a microprocessor, memory, and an asynchronous receiver-transmitter connected by a parallel bus. A serial bus includes transmit, receive, and request lines. Each of the controllers is connected to the transmit and receive lines of the serial bus by way of its asynchronous receiver transmitter. Each controller is connected to the request line of the serial bus through an I/O port. The controller detects an idle period on the serial bus and seizes control of the serial bus using that request line. The asynchronous receiver transmitter is preferably a conventional universal asynchronous receiver-transmitter (UART).

BRIEF DESCRIPTION OF THE DRAWINGS

These and other features and advantages of the present invention will be better and more completely appreciated by studying the following detailed description of the presently preferred exemplary embodiments in conjunction with the attached sheets of drawings of which.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from the specific details. In other circumstances, detailed descriptions of certain well known methods, devices, and circuits are omitted so as not to obscure the description of the present invention with unnecessary detail.

Figure 1:
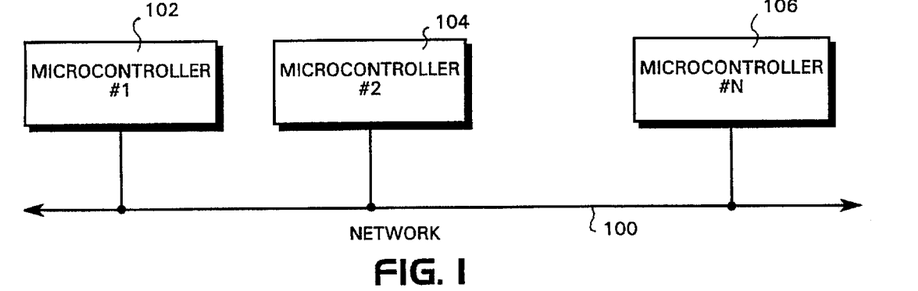
FIG. 1 is a block diagram of a peer-to-peer network with multiple microcontrollers connected to a serial bus.

Referring to FIG. 1, an overall block diagram of a peer-to-peer network in accordance with the present invention is shown. Conventional and standard type microcontrollers 102, 104, and 106 are connected to a serial bus network 100. Naturally, it is to be understood that the network 100 is capable of supporting a large number of microcontrollers. Such conventional microcontrollers may be, for example, the Hitachi microcontroller H"8532" which uses a standard UART to transmit and receive data asynchronously over the network. A more detailed description of the microcontroller hardware and its connection to the network 100 will be described below in conjunction with FIG. 3.

Figure 2:
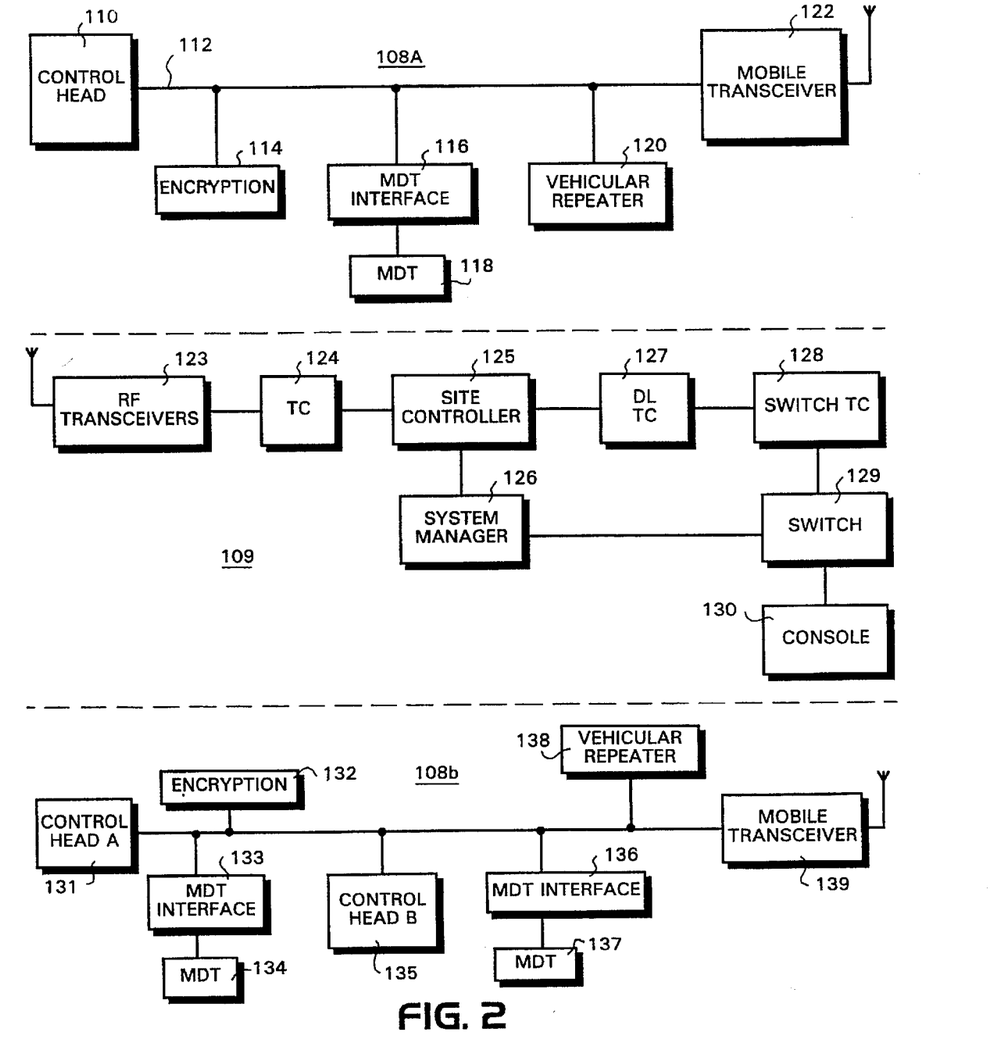
FIG. 2 is a schematic block diagram of an exemplary trunked radio repeater system.

One exemplary application of the present invention is to trunked radio communication systems such as that depicted in FIG. 2. The trunked radio communication system includes at least one and typically many mobile radio transceiving stations (two stations 108a and 108b are shown for purposes of illustration) and an RF repeater station 109. The mobile transceiving stations 108a, 108b communicate over RF links via repeater station 109 with other mobile transceiving stations and/or with land based parties connected to the repeater station 109 by conventional dial-up landlines.

Repeater station 109 includes a site controller 125, individual repeater transceivers 123, and a multiplexing telephone interconnection network or switch 129. Site controller 125 is preferably a high performance digital computer which oversees the general operation of repeater station. In particular, site controller 125 controls the operation of RF transceivers 123 by transmitting digital signals to and receiving digital signals from "trunking cards" (TC) 124 connected between the site controller 125 and individual transceivers 123. Although only one transceiver 123 and one trunking card 124 are shown in FIG. 2, there are typically many such trunking cards/transceiver combinations in repeater station 109—one for each RF channel the repeater station 109 operates on.

Site controller 125 communicates with one or more dispatch consoles 130 through downlink trunking card (DLTC) 127, a switch trunking card 128, and switch 129. A system manager 126 is connected to the site controller 125 and to the switch 129 to oversee and control the overall operation of the trunked radio communication system.

An RF link connects RF transceivers 123 with mobile transceiving stations 108a and 108b. Each mobile station may transmit analog, voice, digitized voice (encrypted or unencrypted) and/or digital data to and may receive such signals from repeater station 109 over the assigned RF link. Mobile station 108a includes a mobile transceiver 122 connected to a control head 110 via a serial bus 112. Mobile transceiver 108a is also connected via the serial bus to a vehicular repeater 120 and a mobile data terminal interface 116/mobile data terminal (MDT) 118. If desired, the MDT 118 may be connected directly to the serial bus 112. A separate digital encryption module 114 performs data encryption and decryption on digitized voice and/or digital data signals using, for example, the conventional DES algorithm or its equivalent is further connected to the serial bus. In the mobile radio configuration 108b, dual control heads 131 and 135 are coupled to the serial bus along with an associated encryption module 132, MDT interface modules 133 and 136, MDT terminals 134 and 137, a vehicular repeater, and mobile transceiver 139.

As illustrated, individual radio units (mobile or portable radio transceivers) of various groups communicate with one another (both within and possibly outside of their own groups) via shared radio repeater channels. The dispatch console 130 supervises the operation of the trunked mobile radio communication system.

Figure 3:
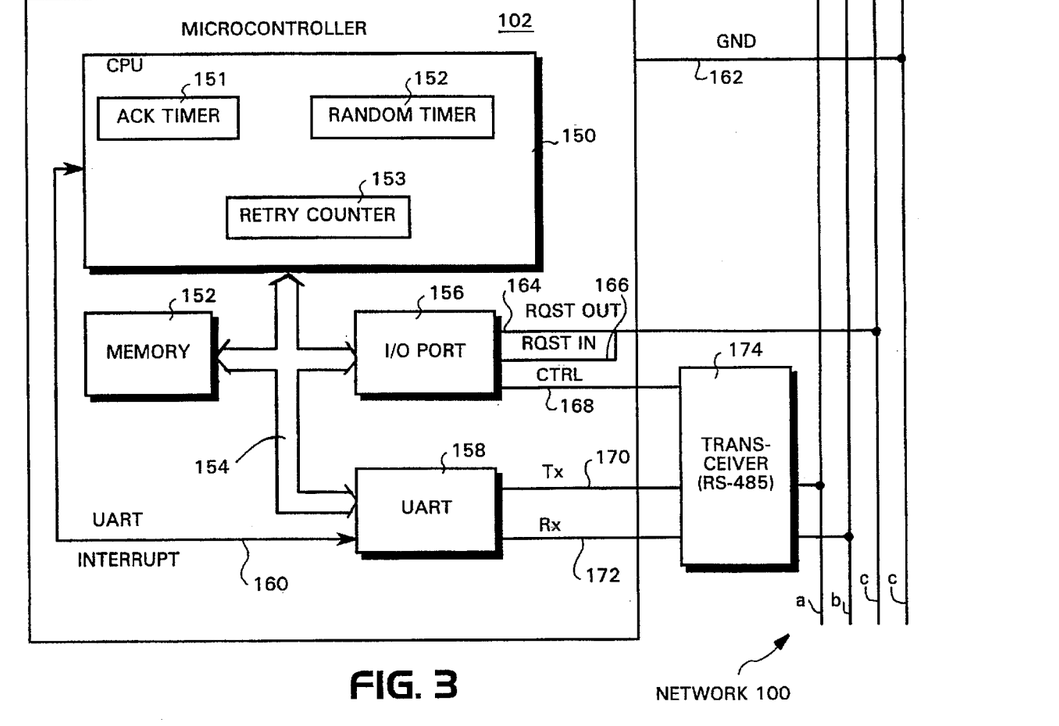
FIG. 3 is a schematic block diagram showing in more detail the internal components of a microcontroller connected to the serial bus network.

FIG. 3 is a schematic diagram of one of the microcontrollers, e.g. 102, illustrated in FIG. 1 connected to serial network 100. The microcontroller 102 is representative of all the mobile transceiving station controllers including each of the "options" connected to mobile radio unit's serial network 112 shown in FIG. 2. For example, mobile transceiving station 108b, control heads 131 and 135, mobile transceiver 139, encryption module 132, and MDT interfaces 133 and 136 can be viewed generically as microcontrollers. Microcontroller 102 includes a standard microprocessor such as the Hitachi H8532, a CPU 150, and on-chip memory 152 which includes random access memory (RAM)

and electrically erasable programmable read only memory (EEPROM). The CPU 150 and memory 152 are connected by way of conventional address, data, and control bus lines 154 to an I/O port 156 and to a conventional universal asynchronous receiver transmitter (UART) 158. Since the present invention provides peer to peer communications using conventional UARTs, a wide variety of conventional microcontrollers can be used without the need for any specialized communication interface or communications protocol. Thus, for purposes of the present invention, "conventional" and "standard" refer to functions, subsystems, and components that are widely accepted in the industry as standard and available from several sources/manufacturers. The UART is an example of one such industry standard.

UART 158 is connected to a conventional transceiver 174 such as an RS-485 transceiver by transmit line 170 and receive line 172. Like the UART 158, the transceiver 174 is conventional and may be, for example, the RS-485 differential bus transceiver available from Texas Instruments as Model Nos. SN65176B, SN75176B. As is well known by those skilled in the art, a differential bus transceiver uses the difference in voltage between two wires to define high and low logic signals.

The transceiver 174 is connected to two conductors A and B of serial network 100. UART 158 also is connected by a UART interrupt line to CPU 150 to indicate to the CPU when the UART has a data word to be transferred from the UART onto the data lines of the address, data, and control (ADC) bus 154. I/O port 156 is connected to the conventional transceiver 174 through a single control line CTRL 168. Control signals from the CPU 150 over the CTRL line 168 direct the transceiver into a transmit mode or a receive mode so that message data in differential format are transmitted on the serial data lines a and b of network 100. With this serial bus configuration communications are restricted to half duplex. I/O port 156 is connected to a service request line c of serial network 100 through a request out (RQST OUT) port 164 and a request in (RQST IN) 166 port. Since only one of the request ports 164 and 166 can be active at any one time, only one signal conductor is necessary for connection to the service request line c of serial network 100. However, those skilled in the art will of course recognize that two dedicated wires could be connected from both request ports 164, 166 to service request line c if so desired. Finally, microcontroller 102 is connected to the ground wire d of the serial network 100 via conductor 162.

Figure 4:
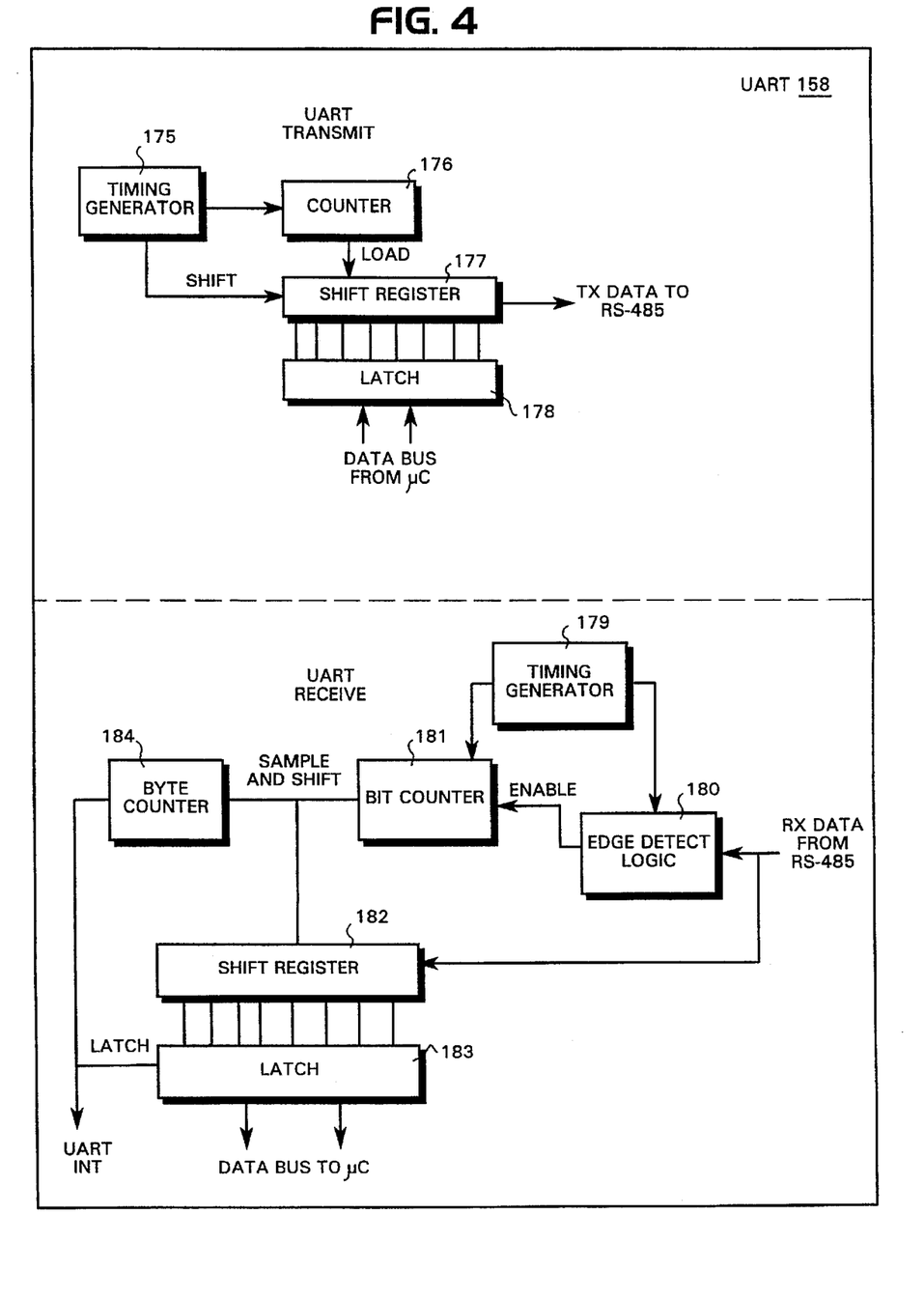
FIG. 4 is a detailed schematic block diagram of the standard UART employed in the microcontroller of FIG. 3.

FIG. 4 shows a detailed schematic block diagram of the conventional UART 158 shown in the microcontroller 102 of FIG. 3. The UART generally is a digital communications subsystem capable of receiving serial data and providing a parallel output and of receiving parallel data and providing a serial output. This operation is half duplex so that both receiving and transmitting can occur simultaneously. The bit rate, number of data bits, parity mode, and number of stop bits are externally selectable. However, for purposes of simplifying the explanation of a standard UART, the control-related elements/operations of the UART are omitted from FIG. 4.

A timing generator 175 such as a baud rate clock controls the "transmit" portion of the UART 158 which permits eight bit words or bytes of data from the microcontroller to be transmitted to the conventional transceiver 174. Counter 176 and shift register 177 receive the clock inputs from the timing generator 175 which control the loading and shifting operations of shift register 177. Eight bits of data on the ADC bus 154 from the CPU 150 are loaded sequentially in parallel to an eight bit latch 178. The data which is stored in the shift register 177 (i.e. the preceding eight bit byte) is shifted out at a high baud rate one bit at a time to the transceiver 174. Thus, the UART is double buffered so that a new byte can be loaded in the latch 178 as soon as the previous one starts transmission in the shift register 177. When counter 176 reaches a full count, (e.g. eight), each count representing a shift operation, it sends a load signal to the shift register and resets its count to zero. In response to the load signal, the shift register 177 loads the eight bits of data presented by the latch 178.

The receive side of the UART operates in a similar fashion to the retransmit portion of the UART. Another timing generator 179 running many times faster than the baud rate outputs sampling signals to edge detect logic 180. When a logic 1 to a logic 0 transition is detected in the serial data received from the transceiver 174, the data is again tested half a bit time later to verify validity of the transition thereby providing noise immunity. Continued sampling of the serial data in the center of the bit time determines the remaining bit values. Those detected bit values are serially input to the eight bit shift register 182 under control of bit counter 181. When one byte has been shifted in to shift register 182, byte counter 184 is activated by the full count in the bit counter 181 to enable latch 183 to receive the eight bits of output from shift register 182. At the same time that byte counter 184 latches the data from shift register 182, it transmits the previously latched eight bits of data onto the data lines of the ADC bus 154 and sends the UART interrupt signal to CPU 150 to receive the eight bits of data from the ADC 154.

Figure 5A:
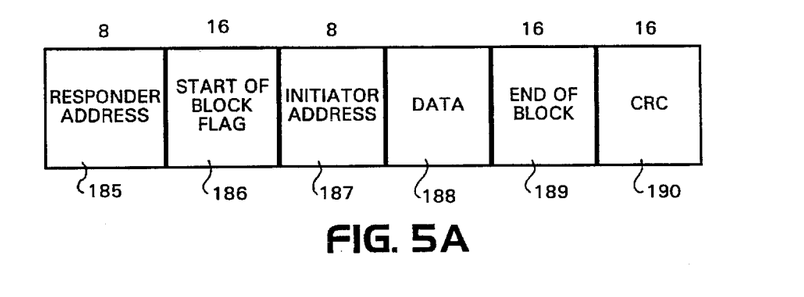
FIGS. 5A and 5B are schematic diagrams of an exemplary serial data bus message format.

FIG. 5A is a schematic diagram of an exemplary format of messages transmitted over serial network 100 by an initiating microcontroller. Each message includes an eight bit responder address field 185, a sixteen bit start of block flag field 186, an eight bit initiator address field 187, one or more data byte field 188, a sixteen bit end of block field 189, and a check sum field 190 (CRC) of sixteen bits. The responder address field 185 specifies the address of the responder microcontroller to which the message is addressed. In the preferred embodiment the responder address has eight bits, four address bits and the same four address bits inverted for error checking. Thus, 16 different "options" can be available. Obviously, more options may be added simply by expanding the address field. The start up block flag field 186 is a unique flag or pattern of data bits which indicates the start of the block. Initiator address field 187 indicates the address of the initiator microcontroller and may include four noninverted and four inverted address bits. Thus, for purposes of the present invention, the term "initiator" refers to a microcontroller who has seized control of the serial network 100 and is sending a message to another microcontroller on the bus hereafter termed "responder." All other microcontrollers monitoring the network but not specifically involved in the message transmitting or receiving transaction are referred to as "receivers." A preformatted unique series of sixteen bits or flag indicates when the data message has been completed in field 189. The CRC bits 190 are analyzed by the responder to ensure that the message was received accurately as a valid message.

Figure 5B:
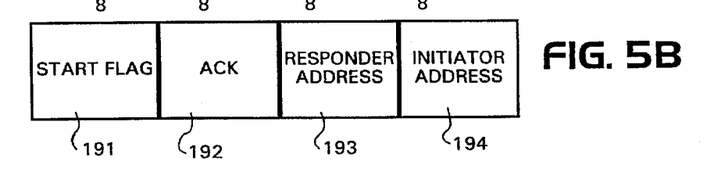

FIG. 5B illustrates an exemplary format of messages transmitted by a responder in response to a message received from an initiator over the serial network 100 and includes an eight bit start flag field 191, an eight bit acknowledge field 192, an eight bit responder address field 193, and an eight bit initiator address field 194. Start flag field 191 is a unique pattern of bits or flag recognized by the other microcontrollers as the start of a responder's acknowledgement. The acknowledgement code indicates that the responder has accurately received the message sent to it by the initiator. Bit fields 193 and 194 indicate the responder and initiator addresses, respectively, and may be configured in the address format described above in conjunction with FIG. 5A.

Figure 6A:
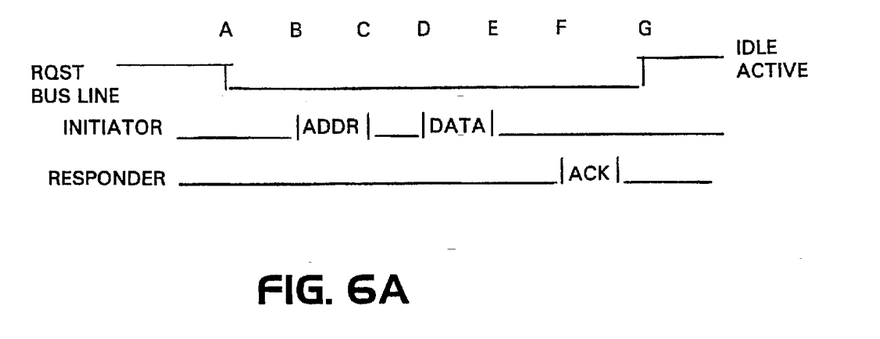
FIGS. 6A and 6B are timing diagrams of exemplary signalling carried out between peer-to-peer microcontrollers over the serial bus network.
Figure 6B:
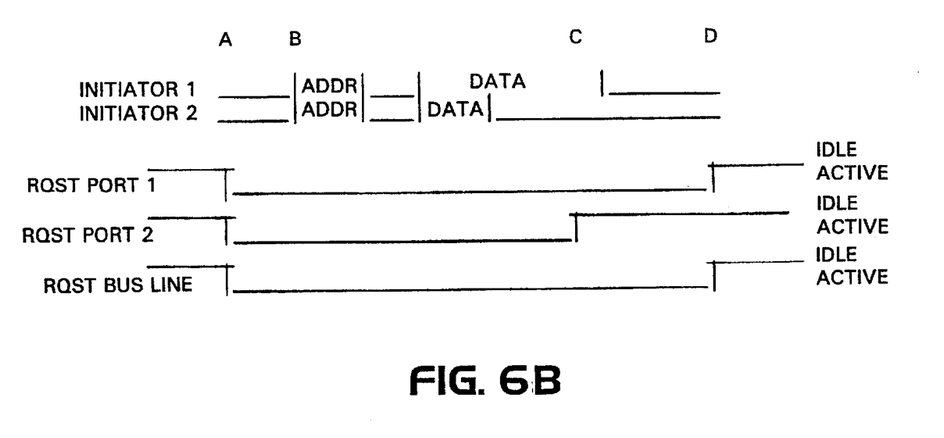

Exemplary operation of the present invention will now be described in conjunction with the timing diagrams shown in FIGS. 6A and 6B. FIG. 6A shows exemplary signal timing for transmission of data or commands by an initiator to a responder microcontroller connected via the serial network 100. At system power up, all microcontrollers on the network are set as receivers with their UART receiver and transmitter portions disabled, and the UART interrupt disabled. The service request line c of serial network 100 is initially set at a logic high which corresponds to idle activity on the network. In other words, none of the microcontrollers has seized control of the serial network 100 to transmit a message.

The microcontroller begins any communication (time A) by reading its "request in" port 166 to detect whether the service request line c is idle. If the service request line c is idle, the microcontroller sets its "request out" port 164 to a logic state which pulls the service request conductor c to an active (low) level. In this way the microcontroller seizes control of the serial network (becoming the initiator) thereby preventing other microcontrollers from attempting to transmit messages at the same time. This also indicates to all other microcontrollers ("receivers") on the serial network 100 that a message is about to be communicated. The receivers enable their UART interrupts and wait for a message address. If the initial status check of request in port 166 indicates that the service request line c is already active at time A, the microcontroller becomes a receiver.

At time B, the initiator switches its transceiver 174 to a transmit mode via an appropriate output on control line 168 and transmits its message through UART 158 over transmit line 170 to transceiver 174 onto data line a of the serial network 100. By time C, the responder address information in the message has been received and analyzed by all receivers to determine if they are the recipient of the message. At time D, the responder continues to receive the message data while all other receivers disable their UART in so they do not waste time processing data that is not for them.

At time E, the message transmission is complete, and the initiator places its transceiver 174 in a receive mode and starts an acknowledgement timer 151 (e.g. a software timer operated by CPU 150). If acknowledgement timer 151 expires before an acknowledgement is received from the responder, the initiator terminates the message transaction and begins procedures to resend the message (to be described in more detail below).

If the responder processes the intended received message and if the data in the message is valid as determined by the CRC checking process, the responder activates its transceiver 174 to a transmit mode, transmits the eight bit acknowledgement code over the network 100 to the initiator, and resets its transceiver back to the receive mode at time F. If the data message is determined to be erroneous, the responder disregards that data message and does not send an acknowledgement. This simplifies the acknowledgement process by permitting the responder to transmit a simple acknowledgement code in a predetermined period of time without requiring the responder to contend for the network as it would for a regular message transaction. This all eliminates considerable network contention traffic and the attendant data processing overhead.

At time G, the initiator has received the acknowledgement code and generates a signal over the request out line 164 to set the service request line c on the network 100 to an idle state. This notifies all other microcontrollers that the network is available for sending messages. As described further below, any microcontroller (including the previous initiator) that thereafter wishes to send a message sets a software random timer 152 in CPU 150 to a random value and then waits for that timer 152 to expire before contending for the request line. Because each microcontroller sets its timer 152 with a different random value, the random timeout minimizes the possibility of multiple microcontrollers seizing the service request line at the exact same time.

Although the present invention minimizes the possibility of two microcontrollers initiating a data transaction in exactly the same time, it is theoretically possible for conflicts to occur. The present invention handles such a simultaneous contention as described below in conjunction the timing diagram shown in FIG. 6B. Of course, the probability of a message "collision" is extremely small since the window during which multiple initiators can seize the service request line c simultaneously is on the order of tens of microseconds.

At time A, colliding initiators 1 and 2 seize the service request line c at the exact same time, and therefore both initiators believe they have control of the network 100. That being the case, both initiators 1 and 2 then transmit their responder addresses in message field 185 at the same time B. These simultaneous address transmissions corrupt each other since they are transmitted on the same line at the same time. As a result, no responder can properly decode a valid address and acknowledge the message. Nonetheless, even if a responder could decode an address, the simultaneously sent data messages would similarly corrupt each other. Because the error correction code in the colliding messages would be invalid, a responder would disregard the message and not send an acknowledgement.

At time C, initiator 2 completes its data transmission and its acknowledgement timer expires. There being no acknowledgement signal sent by a responder, initiator 2 recognizes the transmission has failed and that it must relinquish control of the network. Accordingly, initiator 2 sets the service request line c to idle via its request out port 164 and checks the status of request in port 166. If request in port 166 is low indicating that the service request line c is active, the initiator 2 concludes that it collided with another microcontroller. Initiator 2 then reconfigures itself to be ready to detect when initiator 1 has completed its message and initiator 2 can attempt to seize control of the network to retransmit its message.

At time D, the timeout timer of initiator 1 expires because it does not receive an acknowledgement and sets its request out port 164 to idle. Upon failure to receive an acknowledgement, both initiators 1 and 2 set their respective random timers 152 with random values before trying to retransmit a message. While completely random values are described, priority random timeout values may also be assigned to particular microcontrollers. In other words, the higher the minimum random timeout value assigned to a controller, the less likely it will be able to seize a network, and therefore, the lower its priority.

Figures 7, 12:
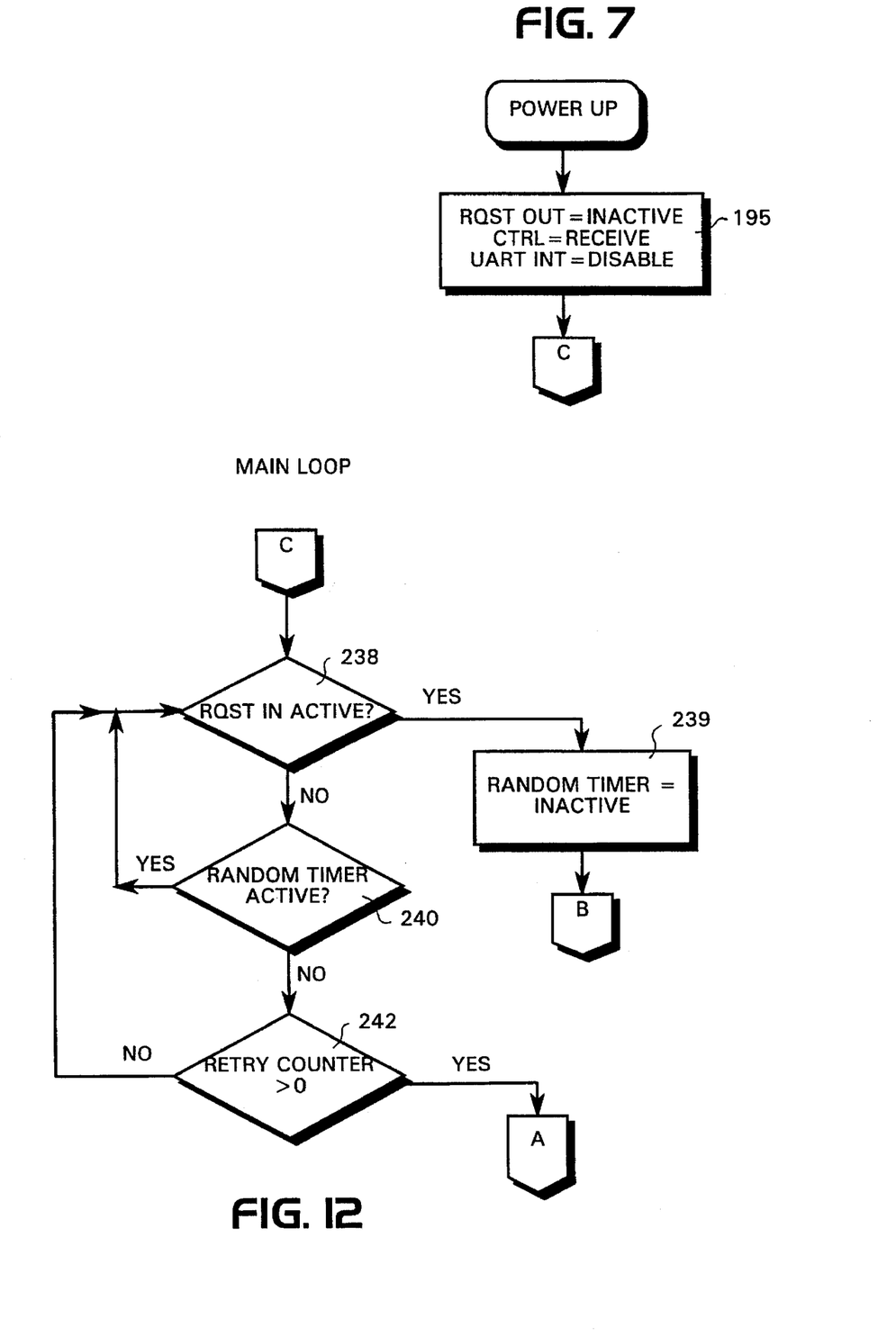
FIGS. 7–12 are flow charts of exemplary program control steps performed on the microcontrollers described in FIGS. 1–4.

FIG. 7 shows the power up initialization routine. The request out port 164 is set to an inactive state for all microcontrollers. The control line 168 is set to receive so that the transceiver 174 is switched to a receive mode to receive data from the network 100. The UART interrupt is disabled to prevent spurious noise-based interrupts (block 195).

Figure 8:
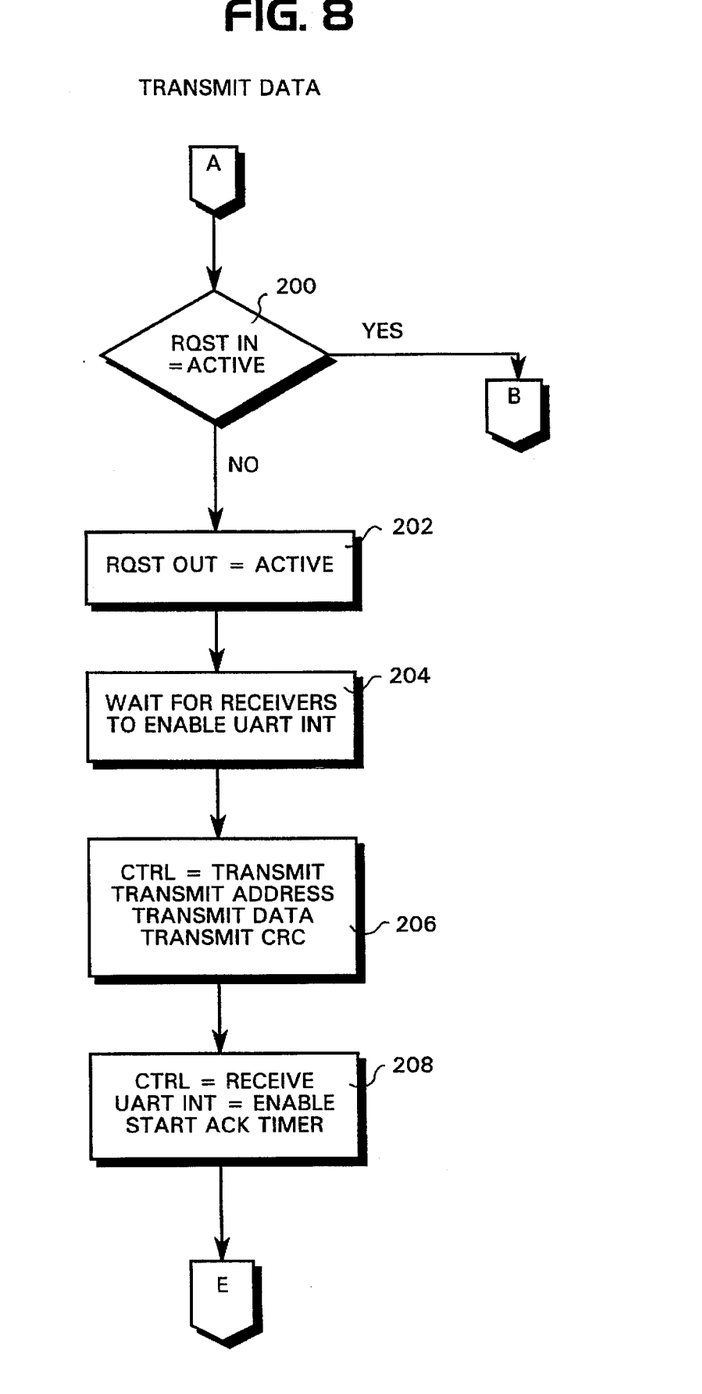

FIG. 8 is a flow chart of exemplary program control steps performed by a microcontroller that intends to transmit a message over the serial network 100. From flag A, control proceeds to a decision block 200 in which the microcontroller checks to determine whether its request in port 166 is active, i.e. the service request line c of serial network 100 is at a low logic level state. If the request in port 166 indicates an active state, control proceeds to flag B described in conjunction with FIG. 10. If the request in port 166 shows the service request line c to be idle, control proceeds to block 202 which sets the request out port 164 active to seize control of the request line C of the serial network 100. The initiator microcontroller then waits a predetermined time delay (block 204) for the receivers to enable their UART interrupt lines. In step 206, the initiator CPU 150 generates a control signal through I/O port 156 onto control line 168 to switch the transceiver 174 into the transmit mode. At that time, the CPU 150 transmits the address, data, CRC, and other information following the message format shown in FIG. 5A through UART 158 which converts this parallel information into serial bits sent over transmit line 170 to the transceiver 174 which then transmits the serial information in differential voltage format on conductors a and b of the network 100. After the message has been transmitted, the initiator CPU 150 changes the control signal to transceiver 174 to switch to a receive mode (block 208), and the UART interrupt 160 is enabled for data reception. The software acknowledgement timer 151 is started at this time as the initiator awaits an acknowledgement code from the addressed responder.

Figure 9:
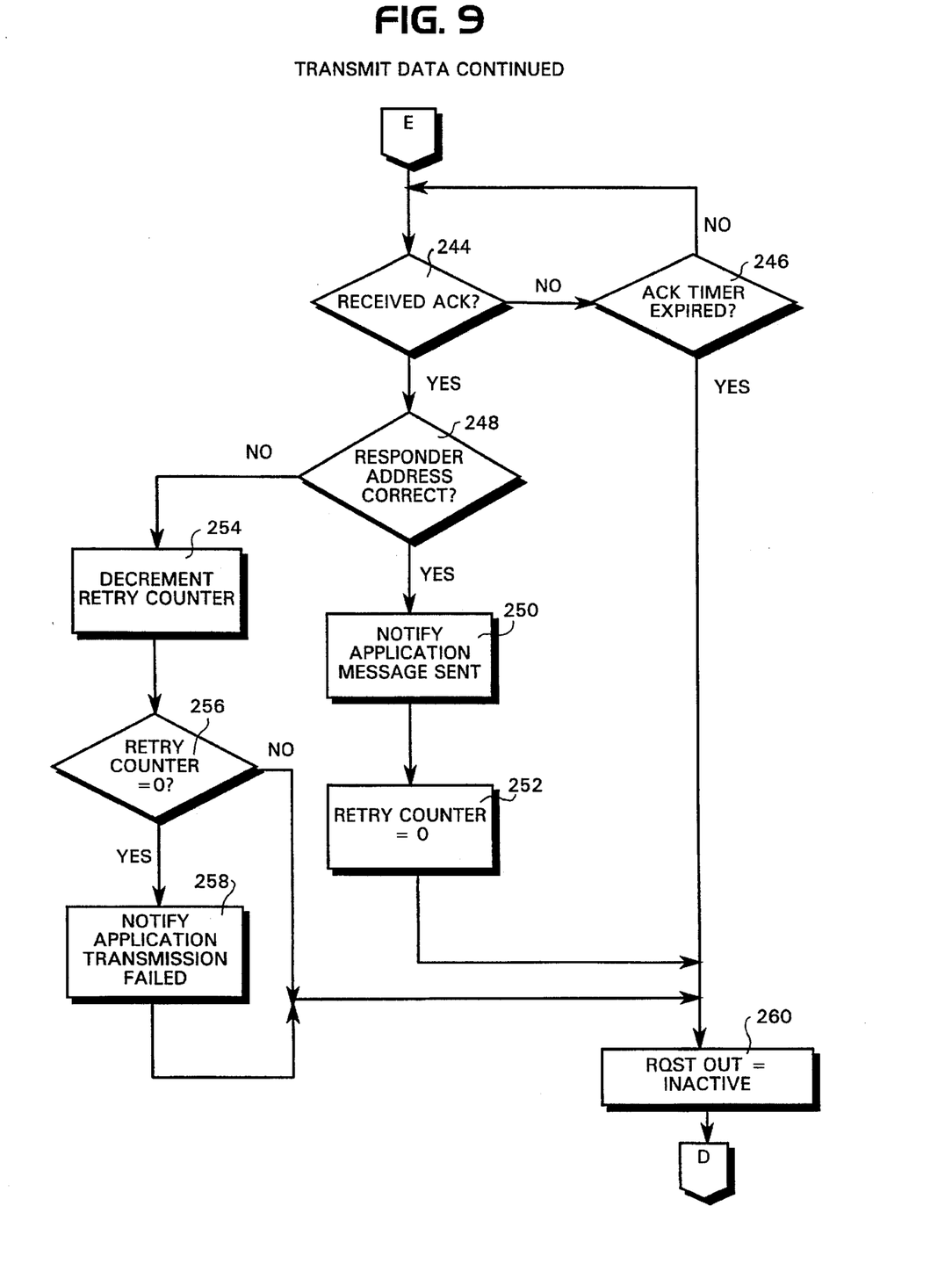

The transmission procedure continues in FIG. 9 at flag E at decision block 244 where a decision is made whether an acknowledgement code has been received by the initiator from the responder. If not, the initiator's acknowledgement timer 151 is checked for expiration in block 246. If it has not expired, the initiator continues to check for the received acknowledgement code. If the timer 151 has expired indicating a failed message attempt, control proceeds to block 260 where the initiator's request out port 164 is set to inactive in block 260 freeing the service request line c in the serial network 100.

If the acknowledgement message is received before the timer 151 expires, the initiator checks to see if the responder's address is correct in block 248. This step accounts for the rare situation where two initiating microcontrollers located at opposite ends of the network simultaneously try to send a message to different responding microcontrollers one of which is physically close on the network to its initiator and the other being physically close to its initiator. Because of the distance along the network between these two initiator-responder pairs, it is possible for the first pair transmission to be sufficiently strong so as not to be corrupted by the other pair transmission (and vice versus). To prevent this unlikely event, the present invention executes decision block 248 to ensure that only acknowledgement signals from the addressed responder are accepted as valid.

If the responder address is incorrect, the initiator decrements its retry counter (block 254) and checks to see if its retry counter 153 equals zero (block 256). The retry counter is the mechanism by which the application software in the microcontroller indicates that data generated by the application needs to be transmitted over the network to another microcontroller. That data is stored and the retry counter is set to some nonzero number, e.g. three, and the control signals are sent by the microcontroller to try and seize control of the network to transmit the data. Each time the attempt to seize the network fails, the retry counter is decremented. Attempts to transmit the application data continue until the retry counter reaches zero. If the retry counter is zero, the initiator notifies the software application being executed by the initiator that the message transmission failed (block 258). Control then proceeds from block 258 (and in a negative condition from block 256) to block 260 where the request out port 164 is set inactive.

If the responder's address is correct in decision block 248, control proceeds to block 250 where the software application is informed that the message was in fact transmitted and acknowledged. The initiator's retry counter 153 is then set to zero in block 252, and its request out port 164 is set to an inactive state (block 260) indicating the end of its message and relinquishing of control of the serial network 100.

Figure 10:
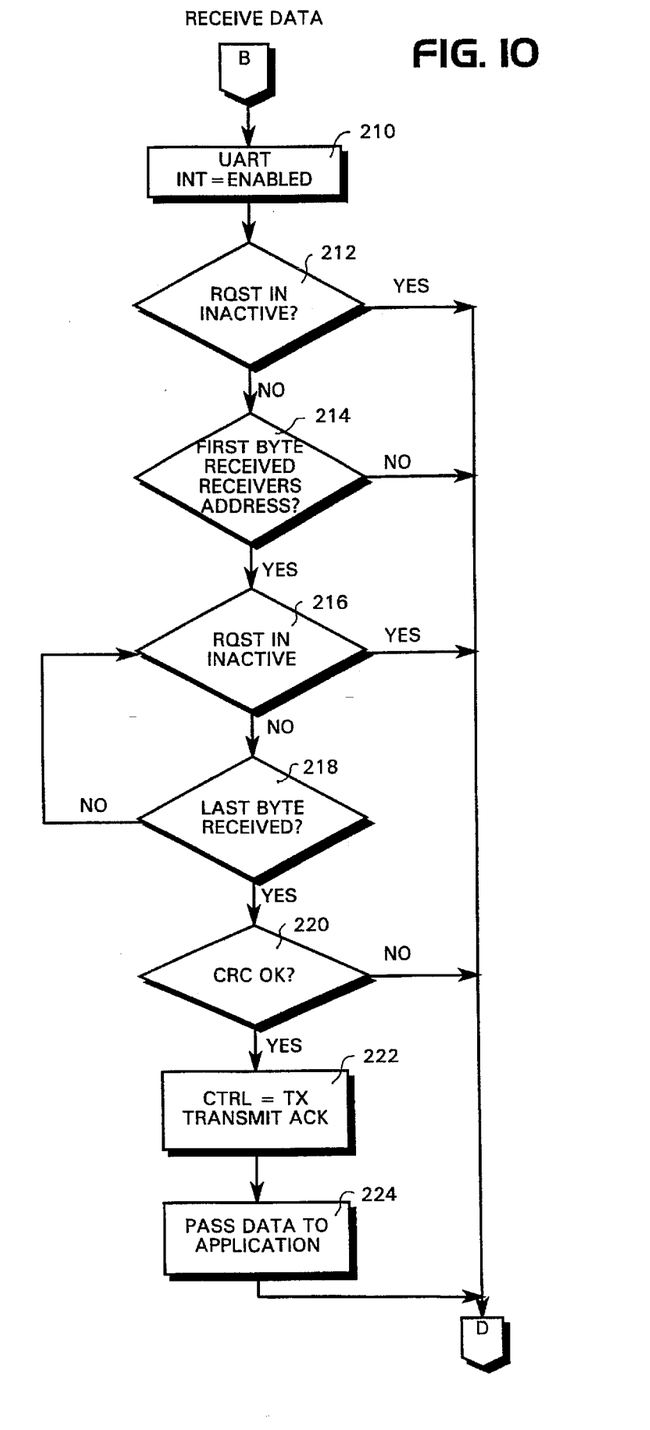

FIG. 10 is a flow chart describing the program steps followed by microcontrollers configured in a message receiving mode. In step 210, the microcontroller enables its UART interrupt so that data can be received from the serial network 100. In decision block 212, the microcontroller again checks the status of the service request line c of the network 100. If it is idle, control proceeds to flag D described in FIG. 11. Otherwise, the microcontroller, which has set its transceiver to a receive mode, decodes the message information received via the serial network on data line b to determine if the first byte of the message corresponds to its own address. If not, control proceeds to flag D.

If the address matches, control proceeds to block 216 where the activity status of the request in port is again checked. If the request in port is active, the message transmitted to this responder is continually decoded until the last byte of that message is detected in block 218. After detecting the last byte, the responder microcontroller checks to see that the CRC error checking bits are valid. If not, control proceeds to flag D; otherwise, a valid message is received. The responder sets the transceiver to a transmit mode via control line 168 and transmits the acknowledgement code via its UART transmit line 170 onto the serial network 100. The validated message data are then passed for processing in accordance with the application software.

Figure 11:
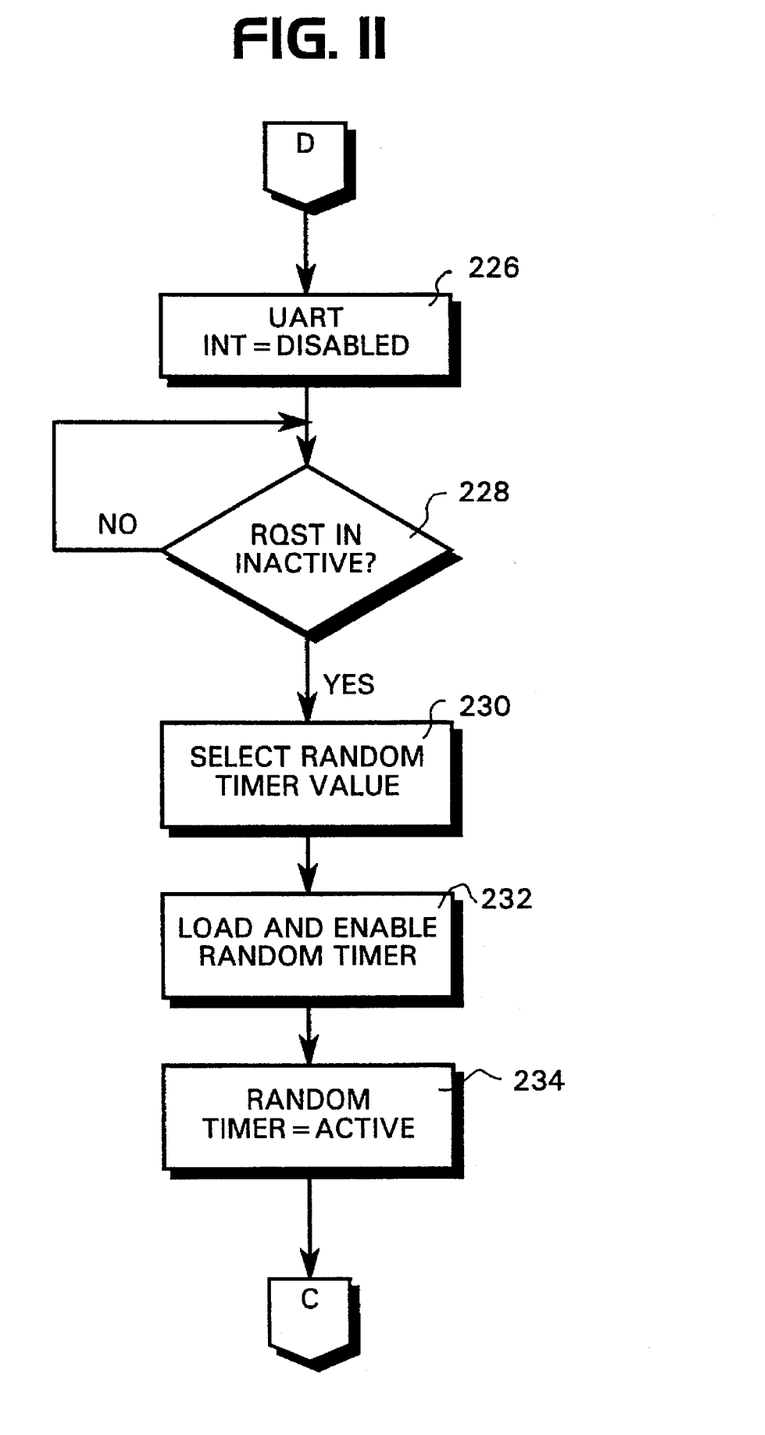

FIG. 11 describes the program steps followed by a microcontroller trying to seize the service request line c immediately following a transmission or reception by any microcontroller on the network. The UART interrupt of the microcontroller is disabled in step 226 which prevents reception of messages over the serial network 100. The microcontroller then continually polls its request in port 166 until an idle state on the service request line c is detected. Upon detecting an idle status, a random value is selected and input to its random software timer 152 in blocks 230 and 232. When the random timer 152 expires, the microcontroller continues at flag C in FIG. 12.

In FIG. 12, the microcontroller than checks its request in port 166 to determine the service request line c activity status (block 238). If active, the random timer 152 is set to an inactive state in block 239 and control proceeds to flag B (FIG. 10) where the microcontroller is configured to receive data. If the service request line c is idle, a decision is made in block 240 whether its random timer 152 is in an active state, i.e. counting down. As long as the random timer 152 is counting down, control loops back and continuously checks to determine that the service request line c remains idle. Once the random timer 152 times out, a decision is made in block 242 whether the controller retry counter 153 is set to a number greater than zero. Assuming that the retry counter 153 is set to a value greater than zero indicating that data needs to be transmitted, control proceeds to flag A (FIG. 8) for seizing the network and transmitting the message.

Thus, the present invention provides a peer to peer communications system that employs standard, nonproprietary hardware and protocols. Using mainstream technology reduces cost and generally provides greater design adaptability and flexibility. Another advantage of the present invention is its simplicity. Control of the network and resolution of network contentions are implemented using only a few existing I/O ports of a conventional microcontroller. In a preferred exemplary application, the present invention allows a mobile transceiver to pass display information to its control head or heads, receive control input such as volume from the control heads, and exchange information with the vehicular repeater, data terminal interface, and other peripherals in peer to peer fashion to provide much greater fault tolerance than the prior art master-slave polling networks.

While the present invention has been described in connection with what is presently considered to be the most practical and preferred embodiments, it is to be understood that the invention is not limited to those disclosed embodiments. On the contrary, the present invention is intended to cover various modifications and equivalent arrangements included within the spirit and scope of the appended claims. While one particularly advantageous application is to mobile radio communications, the present invention can be applied to any situation where efficient peer-to-peer communications are desirable using standard microcontrollers UARTS, transceivers, and communications protocols. In addition, although the present invention has been described in the context of a network polling approach, those skilled in the art will appreciate that the present invention may also be used in an interrupt approach where control of the communications network is interrupt-driven.

What is claimed is:

1. A communications systems comprising:
   plural controllers each controller having a microprocessor, memory, and an asynchronous receiver-transmitter connected by a parallel bus;
   a serial bus including a serial transmit line, a serial receive line, a single request line, each of the controllers being connected to the transmit and receive lines by way of the asynchronous receiver-transmitter for asynchronous data communications with other controllers;
   wherein all of the controllers monitor the single request line to detect availability of the serial bus and each controller seizes control of the serial bus independently of the other controllers and serially transmits data over the serial transmit line using only the single request line.

2. The system according to claim 1, wherein the asynchronous receiver-transmitter is a conventional universal asynchronous receiver-transmitter (UART).

3. The system according to claim 1, each controller further comprising:
   a transceiver connected between the asynchronous receiver-transmitter and the transmit and receive lines of the serial bus for converting binary data signals from the asynchronous receiver-transmitter into differential voltage format for transmission over the serial bus to other controllers and converting differential voltage signals received by the controller into binary data signals.

4. The system according to claim 3, wherein the transceiver is a conventional RS-485 transceiver.

5. The system according to claim 3, wherein each controller sets the transceiver in one of a transmit mode and a receive mode by changing a logic state of a control output from a port of the controller.

6. A communications system comprising:
   plural controllers each controller having a microprocessor, memory, and an asynchronous receiver-transmitter connected by a parallel bars;
   a serial bus including a transmit line, a receive line, a single request line, each of the controllers being connected to the transmit and receive lines by way of the asynchronous receiver-transmitter for asynchronous data communications with other controllers;
   wherein all of the controllers monitor the single request line to detect availability of the serial bus and each controller seizes control of the serial bus independently of the other controllers using the single request line and serially transmits data over the serial transmit line; and
   wherein each controller has a unique address so that a controller having control of the serial bus may directly transmit a data message to a particular controller by including the particular controller's address in the data message, each controller further comprising:
   means for detecting whether a receive message address coincides with the controller's unique address;
   means for determining if the received message is free of errors; and
   means for transmitting an acknowledgment signal over the transmit line to the controller that initiated the message to acknowledge that the message was received without seizing control of the serial bus.

7. The system according to claim 6, wherein the initiating controller includes an acknowledgement timer which times out a preset time period after the message is sent to the particular controller unless the acknowledgement signal is received before the acknowledgement timer times out.

8. A communications system comprising:
   plural controllers each controller having a microprocessor, memory, and an asynchronous receiver-transmitter connected by a parallel bus;
   a serial bus including transmit, receive, and request lines, each of the controllers being connected to the transmit and receive lines by way of the asynchronous receiver-transmitter for asynchronous data communications with other controllers;
   wherein each controller monitors the status of the serial bus and seizes control of the serial bus using a request line,
   wherein each controller has a unique address so that a controller having control of the serial bus may direct data messages to a particular controller by including the particular controller's address in the message, each controller further comprising:
   means for detecting whether a received message address coincides with the controller's unique address;
   means for determining if the received message is free of errors; and
   means for transmitting an acknowledgement signal over the transmit line to the controller that initiated the message was received without seizing control of the serial bus,
   wherein the initiating controller includes an acknowledgement timer which times out a preset time period after the message is sent to the particular controller unless the acknowledgement signal is received before the acknowledgement timer times out, means for resolving attempts by plural controllers to simultaneously seize the serial bus including a random timer for receiving a randomly determined value after the controller fails to receive an acknowledgement signal before the acknowledgement timer times out, wherein the means for resolving permits the controller to attempt to seize control of the serial bus after the random timer times out.

9. The system according to claim 8, wherein priority among plural controllers attempting to seize control of the serial bus is established by assigning different randomly determined values to the controllers and wherein a greater randomly determined value provides a lower priority in terms of seizing control of the serial bus.

10. The system according to claim 2, wherein the conventional UART has a transmit portion that includes a transmit shift register and a transmit latch for converting sequential bytes parallel data transmitted by the microprocessor into a serial format in accordance with a transmit timing generator and a receive portion that includes a receive shift register and a receive latch for converting bytes of serial data into parallel format in accordance with a receive timing generator.

11. The system according to claim 1, wherein each controller includes a request input port and a request output port connected to the single request line of the serial bus such that when the controller detects an idle state of the single request line at the request input port, the controller transmits a logic signal to the request output port to seize control of the serial bus for transmitting a message over the network.

12. A peer to peer network, comprising:

plural microcontrollers connected as peers over a serial network including a data line and only a single network availability line, each microcontroller selectively receiving and transmitting messages to one or more other microcontrollers using an asynchronous receiver-transmitter, wherein each microcontroller obtains control of the serial network independently of the other microcontrollers and coordinates the transmission of messages over the serial network using logic signals sent to a single microcontroller port connected to the single network availability line.

13. The peer to peer network, comprising:

plural microcontrollers connected as peers over a serial network, each microcontroller selectively receiving and transmitting messages to one or more other microcontrollers using an asynchronous receiver-transmitter having a transmit portion that includes a transmit shift register connected to a transmit latch for converting blocks of parallel data to be transmitted over the network into serial format in accordance with timing control signals provided to the transmit shift register from a transmit timer and a receive portion that includes a receive shift register connected to a receive latch for converting blocks of serial data received from the network into parallel format in accordance with clock signals provided to the receive shift register and the receive latch by a sampling clock, wherein the microcontrollers coordinate direct transmission and reception of messages over the serial network using only one request line on the network.

14. The peer to peer network according to claim 13, wherein each microcontroller seizes control of the request line to transmit a message over the network and after a predetermined period of time relinquishes control of the request line.

15. The peer to peer network according to claim 14, wherein after relinquishing control of the request line, each microcontroller sets a corresponding timer with a randomly selected value and waits until the corresponding timer expires before attempting to seize control of the request line.

16. A method of providing peer to peer communications over a serial network having a serial data line and only a single control line by plural controllers connected to the network, each controller independently capable of sending messages over the network to any of the other controllers using the following steps:

(1) monitoring a status of the single control line;
(2) seizing control of the single control line when the single control line is idle using a control signal on the single control line; and
(3) serially transmitting and completing a message addressed to another controller over the serial data line using the control signal on the single control line.

17. The method according to claim 16, further comprising:

(4) starting an acknowledgement timer at completion of the message transmitted in step (3);
(5) relinquishing control of the request line if either the acknowledgement signal is received or the acknowledgement timer times out; and
(6) attempting to again seize control of the single request line if the acknowledgement timer times out.

18. The method according to claim 17, further comprising:

after the relinquishing step (5), waiting a random time delay before the attempting step (6).

19. In a mobile radio communications system providing radio communications between plural mobile stations, each mobile station including a control head connected over a serial bus including a single serial transmit line, a single serial receive line, and a single control line to a mobile transceiver and one or more peripherals, a communication method, comprising coordinating communications between the control head, mobile transceiver, and one or more peripherals in peer to peer fashion with each of the control head, mobile transceiver, and one or more peripherals monitoring and seizing control of the serial bus independently of the others of the control head, mobile transceiver, and one or more peripherals during an idle period using only the single control line in the serial bus and selectively serially transmitting a message over the single serial transmit line in the serial bus.

20. The system according to claim 19, wherein radio communications between plural mobile stations are trunked and at least some of those communications use a trunked repeater station.

21. A method of providing peer to peer communications over a serial network having data lines and a request line between plural controllers connected to the network, each controller independently capable of sending and receiving messages over the network using the following steps:

(1) monitoring a status of the request line;
(2) determining that the serial network is busy based on the monitored status of the request line;
(3) enabling an asynchronous receiver-transmitter in the controller;
(4) determining if a message transmitted over the network using one of said data lines by another controller is addressed to the controller, (5) if the message is addressed to the controller, checking whether the message is valid; and (6) transmitting an acknowledge signal using one of said data lines to the another controller if the message is valid.

22. A method of providing peer to peer communications over a serial network having data lines and a request line between plural controllers connected to the network, each controller independently capable of sending and receiving messages over the network using the following steps:

(1) monitoring a status of the request line;

(2) determining that the serial network is busy based on the monitored status of the request line;

(3) enabling an asynchronous receiver-transmitter in the controller;

(4) determining if a message transmitted over the network by another controller is addressed to the controller, (5) if the message is addressed to the controller, checking whether the message is valid;

(6) transmitting an acknowledge signal to the another controller if the message is valid;

(7) disabling the asynchronous receiver-transmitter;

(8) detecting when a selected random time period has expired since the disabling step (7);

(9) detecting when the request line is idle; and (10) changing a logic state of the request line to seize control of the network.

23. A mobile radio transceiver including:

a serial data bus having first and second serial data lines and a single service control line;

radio frequency circuitry for transmitting and receiving radio frequency signals via an antenna;

a processor for controlling the radio frequency circuitry, said processor being connected to the first and second serial data lines through an asynchronous receiver-transmitter and to the single service control line through an input/output port, wherein when the processor detects an idle state on the service request line through the input/output port, the processor seizes control of the single service control line and transmits a message over the serial bus via the asynchronous receiver-transmitter onto one of the first and second serial data lines using the single service control line, and when the processor detects an active state on the service control line, the processor monitors the other of the first and second serial data lines for messages.

24. The mobile radio transceiver of claim 23, wherein the asynchronous receiver-transmitter is a conventional universal asynchronous receiver-transmitter.

25. A mobile radio transceiver including:

a control head having a control head microcontroller;

a mobile transceiver including radio frequency circuitry for transmitting and receiving radio frequency signals and a mobile transceiver microcontroller;

one or more peripherals having a corresponding peripheral microcontroller;

a peer to peer serial network connecting the control head, mobile transceiver, and peripheral microcontrollers can communicate with any of the other microcontrollers independently of the other microcontrollers, wherein the peer to peer serial network includes a single serial transmit line and only a single request line by which any one of the control head, mobile transceiver, and peripheral microcontrollers monitor and seize control of the peer to peer network independently of the other microcontrollers in order to serially transmit a message over the single serial transmit line.

26. The mobile radio transceiver according to claim 25, wherein the one or more peripherals include an encryption unit, a data terminal, and a vehicular repeater individually connected to the serial data bus.

* * * * *